United States Patent [19]

Nyberg

[11] 4,162,877

[45] Jul. 31, 1979

[54] METHOD AND APPARATUS FOR CONSOLIDATING PARTICLE BOARD

[75] Inventor: Donald W. Nyberg, North Vancouver, Canada

[73] Assignee: Hawker Siddeley Canada Ltd., Toronto, Canada

[21] Appl. No.: 834,050

[22] Filed: Sep. 16, 1977

[30] Foreign Application Priority Data

Sep. 23, 1976 [GB] United Kingdom ............... 39437/76

[51] Int. Cl.[2] ............................................ B29J 5/04

[52] U.S. Cl. ...................................... 425/84; 425/406; 425/404

[58] Field of Search ............... 425/383, 394, 397, 338, 425/379, 404, 411, 406, 445, 808, 810, 84; 264/101, 120, 122, 109

[56] References Cited

U.S. PATENT DOCUMENTS

| | | | |
|---|---|---|---|
| 1,731,240 | 10/1929 | Apfelbaum | 425/406 X |
| 2,111,688 | 3/1938 | Weir | 425/406 X |
| 3,086,248 | 4/1963 | Culp | 425/DIG. 60 |
| 3,280,237 | 10/1966 | Corbin et al. | 264/109 |
| 3,594,461 | 7/1971 | Jacob | 264/101 X |
| 3,832,108 | 8/1974 | Posch et al. | 425/406 X |
| 3,891,738 | 6/1975 | Shen | 264/101 |

*Primary Examiner*—Robert L. Spicer, Jr.

[57] ABSTRACT

A press and method of operation for forming particle board wherein a fiber mat to be compressed is positioned between a pair of peripherally sealed platens through the upper one of which steam is injected when the platens are moved together to compress the fibrous mat and wherein, after a pre-determined time, steam is exhausted from between the two platens and the platens allowed to separate slightly while still compressing the mat to allow steam trapped in the mat to escape slowly before the platens are fully separated.

4 Claims, 2 Drawing Figures

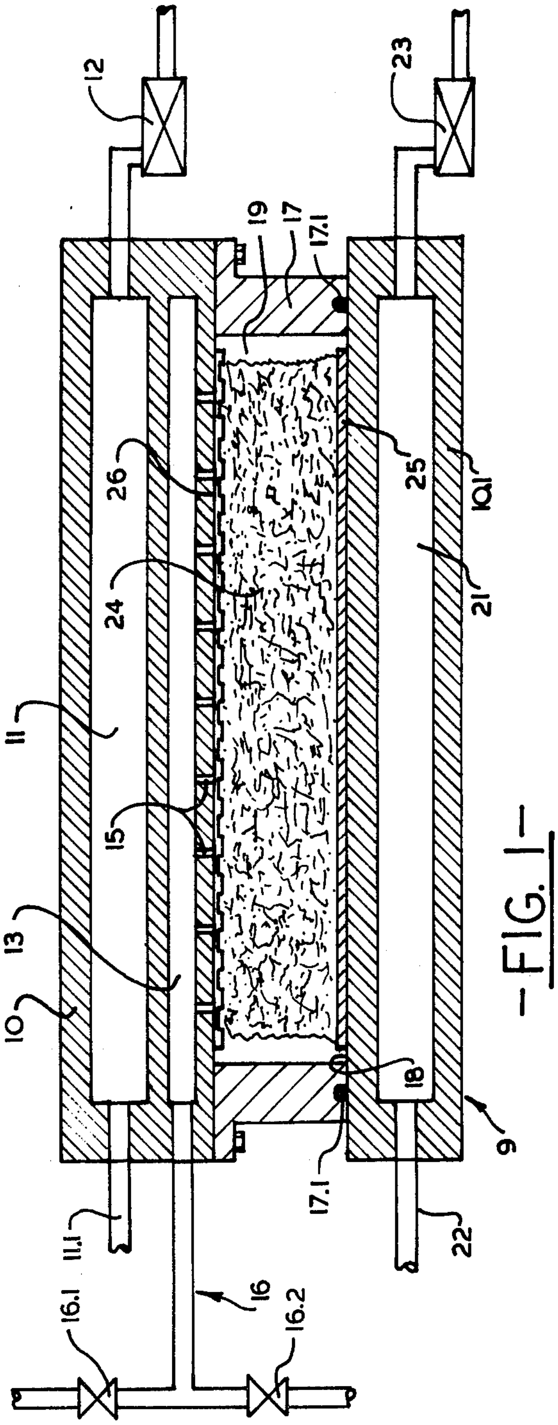
-FIG. 1-

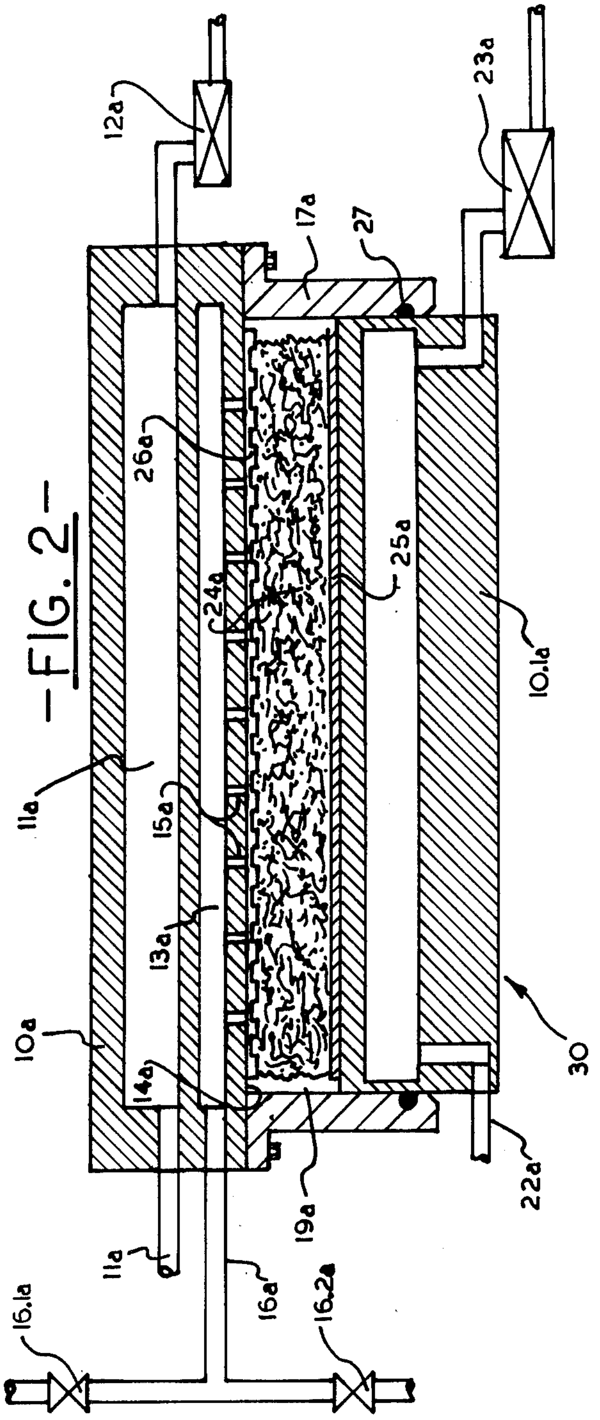
-FIG. 2-

METHOD AND APPARATUS FOR CONSOLIDATING PARTICLE BOARD

BACKGROUND OF THE INVENTION

1. Field of the Invention

This invention relates to method and apparatus for the manufacture of consolidate sheeting material, commonly termed particle board, made from particles and/or fibers of wood or other organic substances 2. Prior Art Particle board which, conventionally, is produced by pressing a mat of resin-coated fibrous material, such as wood fibers and the like, is when subject to moisture in use, prone to thickness swelling. It has been found (see United States Forest Service Research Note FBL-0187 March 1968) that treating finished particle board with steam at about 360° F. for 10 minutes reduces the tendency of particle board to swell under moist conditions and as a result of said finding, the processes of using steam have been developed for adoption in the manufacture of particle board. These processes have, in the main, involved the application of pressurized steam to one side surface of the particle board after the fibrous mat is compressed. After the steam pressure builds up to the required temperature, steam is allowed to escape from the opposite side surface of the board so as to allow the added moisture to escape from the board. This process, particularly with respect to thick boards, results in a greatly decreased manufacturing time due to the rapid setting of the resin in the center of the board.

A process of this nature requires that the fibrous material, in a loose mat, first be laid on a foraminous caul and then the caul and the fibrous mat positioned between a pair of platens through which steam can be injected and extracted while the platens apply pressure to opposite sides of the mat. This process, and apparatus to carry out this process, has some draw-backs. Firstly, unless the press equipment includes a caulless type transfer system, a preferrable caul for this type of process is formed of a wire mesh which is difficult to load in the press due to lack of rigidity and is subject to deformation unless great care is taken in positioning it between the platens. Secondly, this process does not lend itself to multiple sheet production as apparatus requires application of steam to one surface of particle board being one of a plurality of boards being pressed at one time and exhaustion from an opposite side surface of each of the particle boards, is complicated and thus costly.

SUMMARY OF THE INVENTION

The present invention stems from applicant's discovery with the results obtained by applying steam to one side surface of a particle board and exhausting it to the opposite side can be obtained by supplying steam to only one side of the board and after consolidation, with care subsequently exhausting the steam through the same side. Furthermore, it has been found that the steam may be added while the fibrous mat is being compressed to thickness and, after compression has been completed, employing special means to relieve the pressure. Accordingly, two somewhat different forms of apparatus have been found to be effective in carrying out this invention.

When the steam is added through the face of a board, the nature of the fibrous material determines whether it is necessary to interpose a foraminous wire mesh between the face of the board and the adjacent foraminous platen. If the elements of the material have a thickness of over about half a millimeter and the board is not compacted much beyond a specific gravity of 0.7, the wire mesh is not necessary, unless perhaps the material is unusually soft and compactable.

If steam is applied while the board is being consolidated, then when cured, if the platens are separated very slightly to a degree that is dependent on the elasticity of the hot compacted board, it has been found that the steam in the board may be released without causing appreciable internal separation of the elements. Elimination of the wire mesh additionally simplifies the procedure, but as indicated, under adverse conditions or with unsuitable material the additional simplification of omitting the wire mesh may not be attainable with wholly satisfactory results.

In the present invention steam is applied through an upper platen to the upper surface of a sheet of particle board and exhausted from the same surface. Consequently, platen construction is simpler and further the use of a foraminous wire mesh caul plate is obviated and a solid caul plate, which is not subject to the deformation, can be used.

DESCRIPTION OF THE DRAWINGS

FIG. 1 is a vertical sectional view, mainly diagrammatic, illustrating partially one embodiment of the invention, FIG. 2 is a view similar to FIG. 1 illustrating another embodiment of the invention.

DETAILED DESCRIPTION

Referring to the drawings, FIG. 1 shows partially one embodiment 9 of a press in accordance with the invention which has a pair of platens 10 and 10.1 adapted to be moved relative to each other. Actuating and support mechansim for operating the platens between open and closed positions is not shown as such mechanism is well known in the industry. The upper platen 10 is steam-heated having a labyrinth 11 which can be formed as a plurality of inter-connected passages into which steam is supplied through a pipe 11.1 which is exhausted through a trap 12. The platen 10 also has a secondary labyrinth 13 located below the labyrinth 11 and which, like labyrinth 11, can be formed of a plurality of intersecting passages or of one sinuous passage which exhausts through the lower face 14 of the upper platen through a multiplicity of openings 15 which are, for best results, about 1.5 mm. in diameter and which are spaced uniformly apart over the entire lower face. The labyrinth 13 is also connectable, through a conduit arrangement 16 and control valves 16.1 and 16.2, selectively, to either a source of steam or a source of suction.

The upper platen 10 has a lower peripheral wall 17 which carries at its lower edge, a compressable seal 17.1. The seal 17.1 is adapted to make sealing contact with upper face 18 of the lower platen 10.1 so as to provide a sealed chamber 19. The lower platen 10.1, like platen 10, has a heating labyrinth 21 connected through a pipe 22 to a source of steam and which discharges through a trap 23.

A fibrous mat 24 of wooden particles to be compressed is carried on a non-porous metallic caul plate 25 which is in intimate contact with the upper face of the lower platen. Preferrably a wire mesh blanket 26 is interposed between the lower face of the upper platen and the fibrous mat 24.

FIG. 2 illustrates another embodiment 30 of the invention which is similar to embodiment 9 and, consequently, those elements of embodiment 30 which correspond to similar elements of embodiment 9 are accorded the same numerical references as the latter followed by the letter "a".

The press 30 differs from the press 9 in respect of the sealing arrangement to seal the chamber 19*a*. As shown the peripheral wall 17*a* has a continuous inner sealing member 27 formed of a material which has a slidable sealing fit against the sides of the lower platen 10.1*a*.

OPERATION

Referring to FIG. 1, the mat, the fibers of which are coated with a thermo-setting resin, is arranged on the caul plate and covered with the wire mesh and is then placed between the platens. The platens are then moved towards each other, compressing the mat until a seal is effected by engagement of the seal 17.1 with the lower platen. If board thickness is to be thicker than 3.0 cm. suction is applied to the chamber for a period so as to exhaust most of the air and then the chamber is pressurized with steam at over 10 atmospheres, the wire mesh enabling distribution of the steam across the entire upper face of the compressed mat. For boards thinner than 3 cm. suction is usually not necessary.

After the resin has set, steam is released from the chamber and the platens opened very slightly sufficient to reduce, but not release entirely, the pressure on the mat so as to allow steam which has entered the mat to escape. The platens are then fully opened to allow the compressed boards to be removed.

In use of the press 30, which is particularly adapted to produce compressed boards of greater than 3 cm. thickness, the mat 24*a* with its caul plate 25*a* is entered between the two platens and the latter closed until the seal 27 makes sealing contact with the lower platen 10.1*a* and the mat is then compressed to a thickness of about 25 percent greater than the pre-determined thickness of the board. At this stage the mat is quite porous. Suction is then applied to the chamber 19*a* to exhaust most of the air and then the chamber is pressurized with steam at over 10 atmospheres so that the steam permeates the entire mat. Before the resin sets the platens are closed until the mat has reached the final desired thickness. After the resin has set, steam is allowed to exhaust slowly from the chamber and the platens are then separated slightly, still retaining pressure on the board, to allow the steam to escape from the board along its top and bottom surfaces to prevent any appreciable internal delamination. The press can then be fully opened and the caul plate with the compressed board thereon removed.

With respect to both presses, the rate with which pressure can be released depends upon several factors, including surface roughness, board density and dimension, compactability, board elasticity and moisture content.

Although in the description preceeding, reference has been made to use of a foraminous wire mesh over the mat to be compressed, it has been found that if the mat is formed of a hard wood and the elements therein have a cross-section of 0.5 mm, or more, and if the mat is not to be compressed to a density of over 0.7 g/cm$^3$, and if the openings 15 are not more than 75 mm. apart, the wire mesh can be omitted.

Further, although as previously described, the mat is carried directly on the caul plate, wire mesh can be interposed between the caul plate and the mat to facilitate release of steam from the lower surface of the mat and also provide a rough surface texture to the board which is a desired characteristic in certain circumstances.

In both embodiments of the invention, as the caul plate is of solid sheet construction, the mat can be moved, without significant deformation, into position between the platens.

I claim:

1. In a press for compressing a mat of fibrous particles in the production of particle board:

(a) a pair of upper and lower heated platens having confronting pressing faces and movable between open and closed positions, (b) a solid non-porous metallic caul plate for transporting the mat into position between the platens, (c) peripheral sealing means on one of the platens for effecting sealing engagement with the other of the platens so as to provide a sealed chamber enclosing the mat and caul plate as the platens are moved into compressing engagement with the mat, (d) a labyrinth extending through the upper platen connectable selectively to a source of steam and a source of suction, (e) a plurality of passages extending from the labyrinth and opening through the pressing face of the upper platen to enable steam to be injected into and exhausted from the chamber.

2. A press as claimed in claim 1 in which the sealing means includes a peripheral wall extending from one of the platens and a continuous peripheral compressable sealing element mounted on the wall for engaging the pressing face of the other platen.

3. A press as claimed in claim 1 in which the sealing means comprises a peripheral wall extending from the upper platen for encompassing the lower platen when the platens are moved towards the closed position and a continuous compressible sealing element mounted on said peripheral wall effecting slidable sealing engagement with side edge surfaces of the lower platen.

4. A press as claimed in claim 1 including a wire mesh sheet interposed between the pressing face of the upper platen and the mat.

* * * * *